(12) United States Patent
Ouyang et al.

(10) Patent No.: US 11,320,696 B2
(45) Date of Patent: May 3, 2022

(54) BACKLIGHT MODULE, DISPLAY, AND MOBILE TERMINAL

(71) Applicant: HUAWEI TECHNOLOGIES CO., LTD., Guangdong (CN)

(72) Inventors: Shihong Ouyang, Dongguan (CN); Kang Chung Liu, Shanghai (CN); Yiwen Chang, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/308,659

(22) Filed: May 5, 2021

(65) Prior Publication Data

US 2021/0255507 A1 Aug. 19, 2021

Related U.S. Application Data

(63) Continuation of application No. PCT/CN2019/127667, filed on Dec. 23, 2019.

(30) Foreign Application Priority Data

May 30, 2019 (CN) .......................... 201920805599.4

(51) Int. Cl.
*G02F 1/13357* (2006.01)
*G02F 1/1335* (2006.01)

(52) U.S. Cl.
CPC .. *G02F 1/133605* (2013.01); *G02F 1/133531* (2021.01); *G02F 1/133607* (2021.01)

(58) Field of Classification Search
CPC .. G02B 6/0031; G02B 6/0021; G02B 6/0091; G02F 1/133603; G02F 1/133605
See application file for complete search history.

(56) References Cited

U.S. PATENT DOCUMENTS 11,112,555 B2 * 9/2021 Emura ................ G02B 6/0055
2017/0051904 A1 2/2017 Tsai et al.
(Continued)

FOREIGN PATENT DOCUMENTS

CN 102341734 A 2/2012
CN 203907479 U 10/2014
(Continued)

OTHER PUBLICATIONS

PCT International Search Report and Written Opinion in International Application No. PCT/CN2019/127667, Mar. 13, 2020, 12 pages.
(Continued)

*Primary Examiner* — Mariceli Santiago
(74) *Attorney, Agent, or Firm* — Fish & Richardson P.C.

(57) ABSTRACT

An example backlight module, an example display, and an example mobile terminal are provided. The backlight module includes a backplane having a light reflecting surface, a light source layer disposed on the light reflecting surface, and at least one light mixing component disposed on the light source layer. The light source layer has at least one point light source, and the at least one light mixing component is in a one-to-one correspondence with the at least one point light source. Each light mixing component includes a light reflecting layer configured to reflect some light rays emitted by a corresponding point light source, and a light transmission layer configured to transmit a light ray reflected by the light reflecting layer and further reflected by the light reflecting surface. The light reflecting layer is disposed above the light source layer and is configured to reflect some light rays emitted by the corresponding point light source.

19 Claims, 3 Drawing Sheets

(56) References Cited

U.S. PATENT DOCUMENTS

2018/0335559 A1* 11/2018 Cho .................... G02B 6/0016
2019/0137825 A1    5/2019 Kim et al.
2020/0049877 A1*  2/2020 Watanabe ............ G02B 6/0031

FOREIGN PATENT DOCUMENTS

| CN | 105137652 A | | 12/2015 |
|---|---|---|---|
| CN | 108398830 A | | 8/2018 |
| CN | 208621883 U | | 3/2019 |
| CN | 109654404 A | | 4/2019 |
| KR | 20090117419 A | * | 11/2009 |
| KR | 20090117419 A | | 11/2009 |
| KR | 20120135651 A | | 12/2012 |

OTHER PUBLICATIONS

Extended European Search Report issued in European Application No. 19930209.2 dated Dec. 12, 2021, 10 pages.

* cited by examiner

BACKLIGHT MODULE, DISPLAY, AND MOBILE TERMINAL

CROSS-REFERENCE TO RELATED APPLICATION

This application is a continuation of International Application No. PCT/CN2019/127667, filed on Dec. 23, 2019, which claims priority to Chinese Patent Application No. 201920805599.4, filed on May 30, 2019. The disclosures of the aforementioned applications are hereby incorporated by reference in their entireties.

TECHNICAL FIELD

This application relates to the field of mobile terminal technologies, and in particular, to a backlight module, a display, and a mobile terminal.

BACKGROUND

When a liquid crystal display works, a liquid crystal material itself does not emit light, and needs to rely on a passive light source. The light source needs to illuminate a liquid crystal panel from the back, and light output is controlled to form an image. Currently, in a mainstream liquid crystal backlight technology in the market, an LED is used as a light source, and a side-emitting type structure or a direct-emitting type structure is usually used.

In the side-emitting type backlight structure, a light source is disposed on a side of a module. Light rays enter from the side and pass through a light guide plate. The light rays propagate inside a waveguide with a limitation by a waveguide function. The light rays are uniformly coupled and emitted gradually by using scattering dots, to form a surface light source. This solution has advantages of being light and thin. However, all LED light sources need to be always turned on to ensure uniform light output, and light emitting of the LED light sources cannot be adjusted based on brightness of an image region.

In the direct-emitting type backlight, light sources are disposed directly below a panel and uniformly arranged in an array. Light rays are shed directly on a display panel from below, to form uniform illumination on the display panel. A main characteristic of this structure is that light emitting brightness of a light source in a corresponding region may be controlled point by point based on brightness of a displayed image, to reduce power consumption and improve image contrast.

Because the direct-emitting type backlight structure uses a point light source, brightness in a vertical direction is much greater than that in a surrounding region, and a relatively long light mixture distance is required to change the point light source into a surface light source. Therefore, the direct-emitting type backlight structure is usually used in a large-size product insensitive to a thickness such as a television and is difficult to be made thin, and therefore cannot be applied to a scenario such as a mobile phone display that needs to be highly thin.

SUMMARY

This application provides a backlight module, a display, and a mobile terminal, to reduce a light mixture distance in a backlight structure.

According to a first aspect, this application provides a backlight module. The backlight module mainly includes three parts: a backplane having a light reflecting surface, a light source layer disposed on the light reflecting surface, and at least one light mixing component disposed on the light source layer. The light source layer has at least one point light source, and the at least one light mixing component is in a one-to-one correspondence with the at least one point light source. Each light mixing component includes a light reflecting layer configured to reflect some light rays emitted by a corresponding point light source, and a light transmission layer configured to transmit a light ray reflected by the light reflecting layer and then reflected again by the light reflecting surface. The light reflecting layer is disposed above the light source layer and is configured to reflect the some light rays emitted by the corresponding point light source. The light reflecting layer reflects the some light rays emitted by the point light source, and the some light rays are reflected again by the light reflecting surface on the backplane and then emitted from the light transmission layer. In this way, the light rays are more uniformly emitted from the backlight module, and a light mixture distance of the backlight structure is reduced.

In a specific implementation, a light diffusion structure is disposed on at least one of a light input surface and a light output surface of the light transmission layer, to improve light output uniformity of the light transmission layer.

In a specific implementation, the light diffusion structure is a concave-convex structure disposed on the light input surface or the light output surface, to facilitate disposing. A shape of the concave-convex structure may be specifically a jagged shape, to facilitate disposing and improve light output uniformity of the light transmission layer.

In a specific implementation, scattering particles are provided in the light transmission layer, to improve light output uniformity of the light transmission layer.

In a specific implementation, the light reflecting layer is disposed on a surface that is on the light source layer and that is away from the backplane, and the light transmission layer is a part of the light source layer that is not covered by the light reflecting layer, to facilitate disposing.

In a specific implementation, the light reflecting layer is a light reflecting coating covering the surface that is on the light source layer and that is away from the backplane, to facilitate disposing of the light reflecting layer.

In a specific implementation, a vertical distance between the light reflecting layer and the light reflecting surface gradually increases in a direction away from the point light source, so that more light rays emitted by the point light source are emitted from a region away from the point light source, thereby improving a light mixing effect.

In a specific implementation, the light output surface of the light transmission layer is a convex or concave surface, so that a light ray is emitted from the light transmission layer.

In a specific implementation, each light mixing component further includes at least one column that is disposed on the light reflecting layer or the light transmission layer and that can reflect light, to form an air layer used for light mixing above the light transmission layer and the light reflecting layer, thereby improving a light mixing effect.

In a specific implementation, an area of a cross section of each of the at least one column gradually decreases in a direction away from the light reflecting surface, to prevent the column from affecting light mixing.

In a specific implementation, the backlight module further includes a substrate that is disposed on the light source layer and that can transmit light, the light reflecting layer is disposed on a surface that is on the substrate and that is away from the light source layer, and the light transmission layer is a part of the substrate that is not covered by the light reflecting layer. During manufacturing, the light mixing component is first disposed on the substrate, and then the substrate is disposed on the light source layer, to improve an overall yield rate.

In a specific implementation, a plurality of through holes that can transmit light are provided on the light reflecting layer, so that some light rays are output from the through holes on the light reflecting layer, thereby improving a light mixing effect.

In a specific implementation, the backlight module further includes a protective layer for encapsulating the light reflecting layer, to protect the backlight module.

In a specific implementation, the backlight module further includes a light guide layer disposed on the at least one light mixing component. The light transmission layer is a plurality of gluing layers disposed between the light guide layer and the light source layer, and the plurality of gluing layers are arranged at intervals to form an air layer between adjacent gluing layers. The light reflecting layer is an air layer. The air layer is used as the light reflecting layer, so that the some light rays emitted by the point light source may be emitted from the air layer, and after being reflected, the some light rays are reflected at least once and are emitted from the gluing layer, thereby improving a light mixing effect.

In a specific implementation, an area of each of the plurality of gluing layers gradually increases from a position close to the corresponding point light source to a position that is away from the corresponding point light source, so that more light rays are emitted from an edge region of the point light source, thereby improving a light mixing effect.

In a specific implementation, the light guide layer includes a prism film bonded to the plurality of gluing layers and a diffusion film disposed on the prism film, to improve a light mixing effect.

In a specific implementation, the light reflecting surface is a diffuse reflecting surface or a specular reflecting surface with a high reflectivity, to improve reflecting efficiency of the reflecting surface.

According to a second aspect, this application further provides a display. The display includes any one of the foregoing backlight modules, a polarizer stacked on a side that is of the backlight module and that is away from a backplane, and a display layer stacked on the polarizer, to improve a light mixing effect of the display and reduce a thickness of the display.

In a specific implementation, the display further includes a cover plate stacked on a side that is of the display and that is away from the polarizer, to protect the display layer.

According to a third aspect, this application further provides a mobile terminal. The mobile terminal includes a frame and any one of the foregoing displays disposed on the frame, to improve a light mixing effect of the display of the mobile terminal and reduce a thickness of the display.

REFERENCE NUMERALS

10: Backplane; 11: Light reflecting surface; 20: Light source layer

21: Point light source; 31: Light reflecting layer; 311: Through hole

32: Light transmission layer; 321: Optical diffusion structure; 322: Scattering particle

33: Column; 40: Substrate; 50: Protective layer

60: Light guide layer; 61: Prism film; 62: Diffusion film

DESCRIPTION OF EMBODIMENTS

To make the objectives, technical solutions, and advantages of this application clearer, the following further describes this application in detail with reference to the accompanying drawings.

To facilitate understanding of a backlight module provided in the embodiments of this application, an application scenario of the backlight module is first described. The backlight module is applied to a display of a mobile terminal such as a mobile phone or a computer. The following describes in detail the embodiments of this application with reference to the accompanying drawings.

An embodiment of this application provides a backlight module. The backlight module mainly includes three parts based on functions. The three parts are: a backplane having a light reflecting surface, a light source layer disposed on the light reflecting surface, and at least one light mixing component disposed on the light source layer. The following separately describes the three parts in detail with reference to the accompanying drawings.

Figure 1:
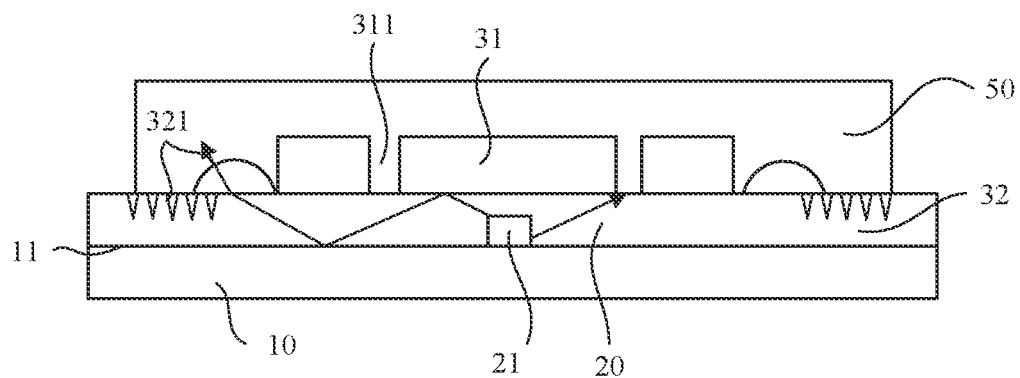
FIG. 1 is a sectional view of a backlight module according to an embodiment of this application.

First, a backplane 10 is described with reference to FIG. 1. The backplane 10 is a board structure. Specifically, the backplane 10 may be a printed circuit board, or may be a board structure disposed on a printed circuit board. Referring to FIG. 1, the backplane 10 includes an upper surface and a lower surface that are opposite to each other (referring to the backlight module shown in FIG. 1), where the upper surface of the backplane 10 is a light reflecting surface 11. When the light reflecting surface 11 is disposed, the light reflecting surface 11 is a diffuse reflecting surface or a specular reflecting surface with a high reflectivity. The high reflectivity is specifically any value that is greater than 0.80 and less than 1.0, such as 0.80, 0.82, 0.85, 0.87, 0.90, 0.92, 0.95, 0.97, and 1.0. When the light reflecting surface 11 is specifically disposed, a coating with a high reflectivity may cover a surface of the board structure, to form the light reflecting surface 11 that can reflect light on the surface of the board structure.

Then, a light source layer disposed on the light reflecting surface 11 of the backplane 10 is described. Still referring to FIG. 1, a light source layer 20 is disposed on the light reflecting surface 11 of the backplane 10, and the light source layer 20 has at least one point light source 21. When the point light source 21 is specifically disposed, the point light source 21 may be a light emitting diode, or may be another point light source 21 that can emit light. In addition, light emitted by the point light source 21 is not limited to white light, and may also be light of another color such as blue light. When a quantity of point light sources 21 is determined, the quantity of point light sources 21 may be any value of at least one of 1, 2, 4, 8, 16, or the like. When there are a plurality of point light sources 21, referring to FIG. 1 and FIG. 6, an array of the plurality of point light sources 21 is arranged on the light reflecting surface 11 of the backplane 10. It should be understood that an arrangement manner of the plurality of point light sources 21 is not limited to the disposing manner of the foregoing array arrangement, and another disposing manner may be used.

Referring to FIG. 1, the light source layer 20 further has an encapsulating material for encapsulating the at least one point light source 21. The encapsulating material may be silica gel, or may be another conventional encapsulating material that can transmit light, to protect the point light source 21. In addition, the encapsulating material does not affect light ray output of the point light source 21. In addition, when the point light source 21 is encapsulated to form the light source layer 20, phosphor may be mixed into the encapsulating material, to change a color of light emitted by the point light source 21. It should be understood that a disposing manner of the light source layer 20 is not limited to the foregoing disposing manner. In addition, another disposing manner may be used.

The following describes the light mixing component used to mix light of the point light source 21. Referring to FIG. 1, the at least one light mixing component is disposed on the light source layer 20, and the at least one light mixing component is in a one-to-one correspondence with the at least one point light source 21. Specifically, a quantity of light mixing components is equal to that of point light sources 21, and each light mixing component corresponds to one point light source 21. Each light mixing component is disposed in a region above a corresponding point light source 21 and a region between two adjacent point light sources 21, to mix light of the point light sources 21. Each light mixing component includes a light reflecting layer 31 configured to reflect some light rays emitted by a corresponding point light source 21, and a light transmission layer 32 configured to transmit a light ray reflected by the light reflecting layer 31 and then reflected again by the light reflecting surface 11. Specifically, referring to FIG. 1, the light reflecting layer 31 is disposed right above the corresponding point light source 21 or in a region approximately right above the point light source 21. The light transmission layer 32 is disposed in an edge region of the corresponding point light source 21. To be specific, when there are a plurality of point light sources 21, the light transmission layer 32 is disposed in a region between adjacent point light sources 21. The light reflecting layer 31 is disposed above the light source layer 20 and is configured to reflect the some light rays emitted by the corresponding point light source 21. The light reflecting layer 31 reflects the some light rays emitted by the point light source 21, and the some light rays are reflected again by the light reflecting surface 11 on the backplane 10 and then emitted from the light transmission layer 32. In this way, the light rays are more uniformly emitted from the backlight module. There are a plurality of specific manners of disposing the light reflecting layer 31 and the light transmission layer 32. The following uses one point light source 21 and one light mixing component as an example for description with reference to the accompanying drawings.

Figure 2:
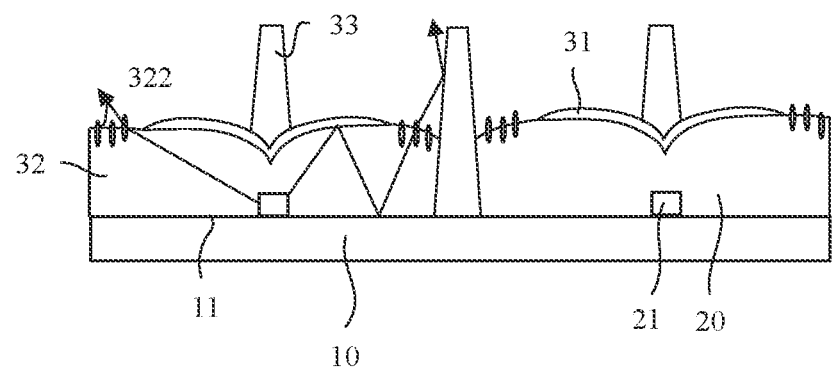
FIG. 2 is a sectional view of another backlight module according to an embodiment of this application.

Referring to FIG. 1, the light reflecting layer 31 is disposed on a surface that is on the light source layer 20 and that is away from the backplane 10. In this case, the light transmission layer 32 is a part of the light source layer 20 that is not covered by the light reflecting layer 31. During disposing, the light reflecting layer 31 may be a conventional light reflecting board that can reflect light in the prior art, and the light reflecting board may be disposed on the light source layer 20 in a bonding manner. It should be understood that a disposing manner of the light reflecting layer 31 is not limited to the foregoing disposing manner of using the light reflecting board. In addition, another disposing manner may be used. For example, referring to FIG. 2, the light reflecting layer 31 may be a light reflecting coating covering the surface that is on the light source layer 20 and that is away from the backplane 10, to facilitate disposing. A material of the light reflecting coating is a material that can reflect light and is easy to coat in the prior art. Referring to FIG. 1, the light reflecting layer 31 is disposed in a region right above and a region diagonally above the corresponding point light source 21 (the backlight module shown in FIG. 1 is used as a reference), so that a coverage area of the light reflecting layer 31 is greater than that of the point light source 21. Referring to FIG. 1, a light input surface of the light reflecting layer 31 may be a plane parallel to or approximately parallel to the light reflecting surface 11, to simplify disposing. Referring to FIG. 2, the light input surface of the light reflecting layer 31 may also be an arc-shaped surface that curves inwards. Specifically, a vertical distance between the light reflecting layer 31 and the light reflecting surface 11 gradually increases in a direction away from the point light source 21, so that the light ray emitted by the point light source 21 is transmitted to a position that is away from the point light source 21 after being reflected by the light reflecting layer 31 and the light reflecting surface 11 for a plurality of times, and more light rays emitted by the point light source 21 are emitted from a region away from the point light source 21, to improve a light mixing effect. It should be understood that a shape of the light reflecting surface 11 is not limited to the foregoing disposing manner, and another disposing manner may be used.

Figure 3A:
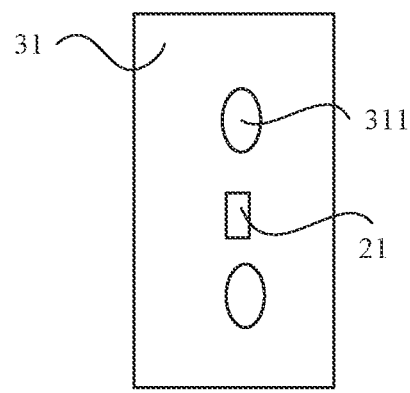
FIG. 3A is a schematic diagram of a light emitting layer according to an embodiment of this application.
Figure 3B:
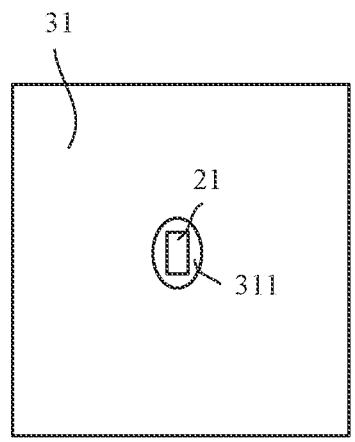
FIG. 3B is a schematic diagram of another light reflecting layer according to an embodiment of this application.
Figure 3C:
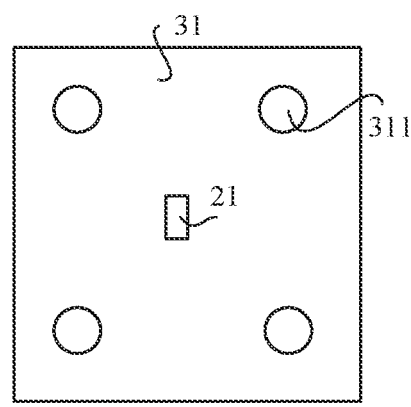
FIG. 3C is a schematic diagram of a light emitting layer according to an embodiment of this application.

Referring to FIG. 2, the light reflecting layer 31 may be a complete structure without a through hole. Referring to FIG. 1, a through hole 311 that can transmit light is disposed on the light reflecting layer 31. During specific disposing, as shown in FIG. 3A, two elliptic through holes 311 are disposed on the light reflecting layer 31. As shown in FIG. 3B, one elliptic through hole 311 is disposed on the light reflecting layer 31, and a center of the through hole 311 coincides with that of a corresponding point light source 21. As shown in FIG. 3C, four circular through holes 311 are disposed on the light reflecting layer 31, and the four circular through holes 311 surround the point light source 21. It should be understood that a quantity of through holes 311 is not limited to that used in the foregoing disposing manner, and may be specifically any value of at least one of one, two, three, or the like. A shape of the through hole 311 is not limited to the foregoing elliptical or circular disposing manner. In addition, the shape of the through hole 311 may be any shape such as a triangle or a rectangle. When there is one through hole 311, a disposing position of the through hole 311 is not limited to the foregoing disposing manner in which the center of the through hole 311 coincides with that of the point light source 21, and the through hole 311 may be disposed at another position. When there are two or more through holes 311, the disposing position of the through hole 311 is not limited to the foregoing disposing manner of surrounding the point light source 21, and another arrangement manner may be alternatively used. For example, a plurality of through holes 311 are arranged on the light reflecting layer 31 in an unordered manner. The unordered manner is all manners that help uniformly emit a light ray. The through hole 311 is disposed on the light reflecting layer 31, so that some light rays on the point light source 21 are emitted from the through hole 311, thereby reducing light ray intensity above the point light source 21 and making the light ray intensity above the point light source 21 more uniform.

Referring to FIG. 1, the light transmission layer 32 is a part of the light source layer 20. To be specific, the light output surface of the light transmission layer 32 is a surface that is on the light source layer 20 and that is away from the backplane 10, and the light input surface of the light transmission layer 32 is a surface that faces the backplane 10. Referring to FIG. 1, the light output surface of the light transmission layer 32 may be a plane, to simplify disposing. Referring to FIG. 2, the light output surface of the light transmission layer 32 may further be a convex or concave surface, that is, a vertical distance between the light output surface of the light transmission layer 32 and the light reflecting surface 11 of the backplane 10 gradually changes in a direction away from the point light source 21, to form the convex or concave surface, so that a light ray is emitted from the light transmission layer 32. In the foregoing disposing manner, the light transmission layer 32 can directly emit, from the light transmission layer 32, the some light rays emitted by the point light source 21. In addition, a light ray reflected by the light reflecting layer 31 is reflected by the light reflecting surface 11 and then emitted from the light transmission layer 32. Intensity of an emitted light ray around the point light source 21 is improved, so that the light ray emitted by the point light source 21 is more uniformly emitted from the backlight module. It should be understood that disposing manners of the light input surface and the light output surface of the light transmission layer 32 is not limited to the foregoing disposing manners, and another disposing manner may be used.

Referring to FIG. 1 and FIG. 2, to enable a light ray to be more uniformly emitted from the light transmission layer 32, a light diffusion structure 321 is disposed on at least one of the light input surface and the light output surface of the light transmission layer 32. During specific disposing, referring to FIG. 1, the light diffusion structure 321 is a concave-convex structure disposed on the light output surface of the light transmission layer 32. The concave-convex structure may be a spherical protrusion disposed on the light output surface of the light transmission layer 32, or may be a jagged concave-convex structure, so that the light rays are more uniformly emitted from the light transmission layer 32. The light diffusion structure 321 is not limited to the foregoing disposing manner, and another conventional disposing manner that can help light diffusion in the prior art may be used. FIG. 1 and FIG. 2 only show that the light diffusion structure 321 is disposed on the light output surface of the light transmission layer 32. It should be noted that, in addition to the foregoing disposing manner of disposing the light diffusion structure 321 on the light output surface of the light transmission layer 32, the light diffusion structure 321 may be alternatively disposed on the light input surface of the light transmission layer 32. In other words, the disposing manner of disposing the light diffusion structure 321 on at least one of the light input surface or the light output surface of the light transmission layer 32 falls within the protection scope of the embodiments of this application.

In addition, referring to FIG. 2, scattering particles 322 may be further disposed in the light transmission layer 32. The scattering particles 322 are specifically conventional scattering particles 322 that can help light ray scattering in the prior art. When the scattering particles 322 are specifically disposed, the scattering particles 322 may be disposed in the light transmission layer 32. Specifically, all the scattering particles 322 may be arranged in the light transmission layer 32. Alternatively, some scattering particles 322 may be embedded in the light transmission layer 32, and some scattering particles 322 are exposed outside the light transmission layer 32. The scattering particles 322 are disposed in the light transmission layer 32, so that light output uniformity of the light transmission layer 32 can be improved.

Referring to FIG. 1, the light reflecting layer 31 is further encapsulated by a protective layer 50, to protect the backlight module. During specific disposing, a material of the protective layer 50 is a light transmission material. Specifically, a silica gel material may be selected. During encapsulation, phosphor may be mixed into the protective layer 50, to change a color of the light ray emitted by the point light source 21.

In addition, referring to FIG. 2, at least one column 33 that can reflect light may be further disposed on the light reflecting layer 31 or the light transmission layer 32, to form an air layer used for light mixing above the light transmission layer 32 and the light reflecting layer 31. As shown in FIG. 2, the column 33 may be disposed on the light reflecting layer 31. The column 33 may be alternatively disposed on the light transmission layer 32. For ease of disposing, the column 33 may be disposed on the light reflecting surface 11 of the backplane 10, and one end of the column 33 is exposed outside the light transmission layer 32. A material of the column 33 may be a conventional light transmission material in the prior art, to prevent the column 33 from affecting a light mixing effect. A surface of the column 33 may be coated with a material that can reflect light, to improve a light mixing effect. Referring to FIG. 2, an area of a cross section of each column 33 gradually decreases in a direction away from the light reflecting surface 11, that is, a lower end of the column 33 is larger and an upper end of the column 33 is smaller (refer to the backlight module shown in FIG. 2). During specific disposing, the column 33 may be a cone structure, or may be a tapered prism structure. A structure with a larger lower end and a smaller upper end is used as the column 33, to prevent the column 33 from affecting light mixing. When a quantity of columns 33 is determined, there may be one or two or more columns 33 in each light mixing component. When there are two or more columns 33, the two or more columns 33 may be arranged around the point light source 21. In a specific application, when a polarizer or another layer structure is stacked on the backlight module, because the column 33 supports the layer structure, an air layer that can be used for light mixing is provided above the light mixing component, thereby improving a light mixing effect. It should be understood that the foregoing shows only one disposing manner of the column 33, and another disposing manner may be used.

Figure 4:
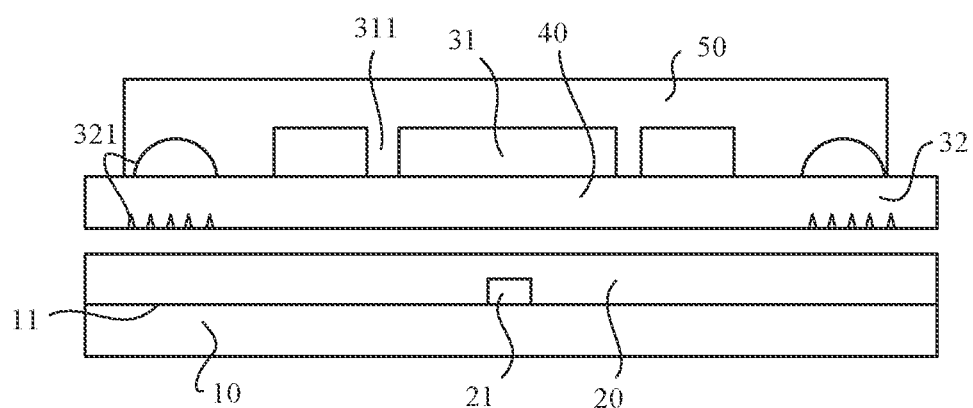
FIG. 4 is a sectional view of another backlight module according to an embodiment of this application.

The foregoing shows only the disposing manner of disposing the light reflecting layer 31 on the light source layer 20. It should be understood that the light reflecting layer 31 is not limited to the disposing manner of directly disposing the light reflecting layer 31 on the light source layer 20. For example, referring to FIG. 4, the backlight module further includes a substrate 40 that is disposed on the light source layer 20 and that can transmit light, and the light reflecting layer 31 is disposed on a surface that is on the substrate 40 and that is away from the light source layer 20. In this case, the light transmission layer 32 is a part of the substrate 40 that is not covered by the light reflecting layer 31. A material of the substrate 40 may be specifically PET (polyethylene terephthalate). During specific disposing, a disposing manner of the light reflecting layer 31 is basically the same as the foregoing disposing manner, except that a disposing position is different. Referring to FIG. 4, the light reflecting layer 31 is disposed on a side that is of the substrate 40 and that is away from the light source layer 20. A disposing manner of the light transmission layer 32 is basically the same as the foregoing disposing manner, except that composition of the light transmission layer 32 is different. Referring to FIG. 4, the light transmission layer 32 is a part of the substrate 40 that is not covered by the light reflecting layer 31. The light input surface of the light transmission layer 32 is a surface that is on the substrate 40 and that faces the light source layer 20. The light output surface of the light transmission layer 32 is the surface that is on the substrate 40 and that is away from the light source layer 20. As shown in FIG. 4, the light diffusion structure 321 is disposed on both the light input surface and the light output surface of the light transmission layer 32, to improve light ray output uniformity. During manufacturing, the light mixing component is first disposed on the substrate 40, and then the substrate 40 is disposed on the light source layer 20, to prevent a processing failure of the light mixing component from affecting reuse of the light source layer 20, thereby improving an overall yield rate.

In addition to the foregoing manners, a backlight layer and the light transmission layer 32 may be disposed in another manner. For example, referring to FIG. 5, the backlight module further includes a light guide layer 60 disposed on the at least one light mixing component. The light transmission layer 32 is a plurality of gluing layers disposed between the light guide layer 60 and the light source layer 20, and the plurality of gluing layers are arranged at intervals to form an air layer between adjacent gluing layers. The light reflecting layer 31 is an air layer. Because a refraction angle of a light ray becomes smaller when the light ray is propagated from an optically denser medium to an optically thinner medium, total reflection of the light occurs, so that the some light rays emitted by the point light source 21 are reflected from the air layer. Because a difference between a density of the gluing layer and densities of the light source layer 20 and the light guide layer 60 is less than a difference between a density of air and the densities of the light source layer 20 and the light guide layer 60, it is easier to emit a light ray from the gluing layer than to emit light from the air layer. In this way, the light reflected by the air layer is reflected by the light reflecting surface 11 on the backplane 10, and then may be emitted by using the gluing layer, so that a light mixing effect can be improved by controlling a disposing position of the gluing layer.

Figure 5:
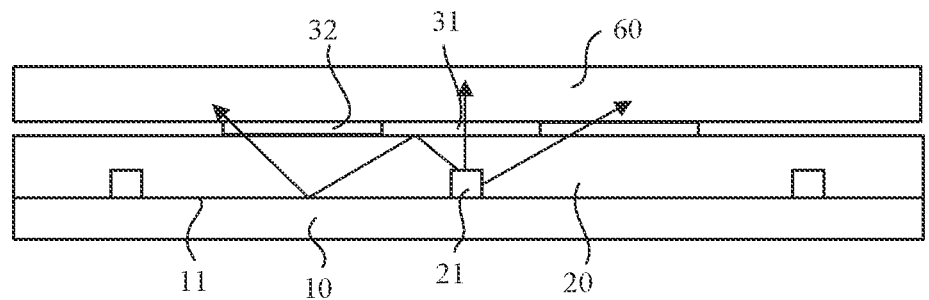
FIG. 5 is a sectional view of another backlight module according to an embodiment of this application.
Figure 6:
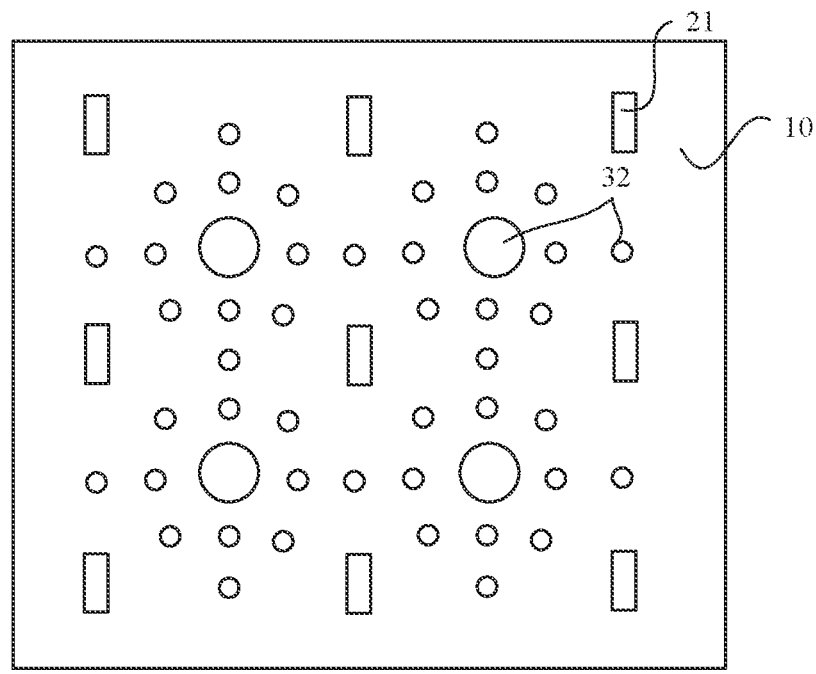
FIG. 6 is a top view of the backlight module provided in FIG. 5.

During specific disposing, referring to FIG. 5, the light reflecting layer 31 may be disposed in an upper region of each point light source 21, or may be disposed in a region between two adjacent point light sources 21. When the gluing layer is disposed, a material of the gluing layer is specifically a material that can transmit light in the prior art, for example, may be an OCA optically clear adhesive (which is a special adhesive used to bond a transparent optical element). There may be specifically at least 2, such as 2, 4, 8, 12, 16, gluing layers. A shape of each gluing layer may be specifically a circle shown in FIG. 6, or may be another shape such as an ellipse, a rectangle, or a triangle. The plurality of gluing layers may be arranged in an arrangement manner of an array shown in FIG. 6, or may be arranged in another manner. Areas of all the plurality of gluing layers may be equal or not equal. Referring to FIG. 6, an area of each of the plurality of gluing layers gradually increases from a position close to the corresponding point light source 21 to a position that is away from the corresponding point light source 21, so that more light rays are emitted from an edge region of the point light source 21, thereby improving a light mixing effect. It should be understood that the foregoing shows only several disposing manners of the gluing layer, and another disposing manner may be used.

To improve a light mixing effect of the light transmission layer 32, when the gluing layer is the light transmission layer 32, the light diffusion structure 321 may be disposed on a surface that is on the gluing layer and that is bonded to the light guide layer 60. Alternatively, the light diffusion structure 321 may be disposed on a surface that is on the gluing layer and that is bonded to the light source layer 20. To be specific, the manner of disposing the light diffusion structure 321 on either or both of the surface that is on the gluing layer and that is bonded to the light guide layer 60 or the surface that is on the gluing layer and that is bonded to the light source layer 20 falls within the protection scope of this embodiment of this application. The light diffusion structure 321 is disposed on the gluing layer, to improve a light mixing effect. The scattering particles 322 may be further disposed in the gluing layer. During specific processing, the scattering particles 322 may be doped into a gluing material, to improve a light mixing effect.

Figure 7:
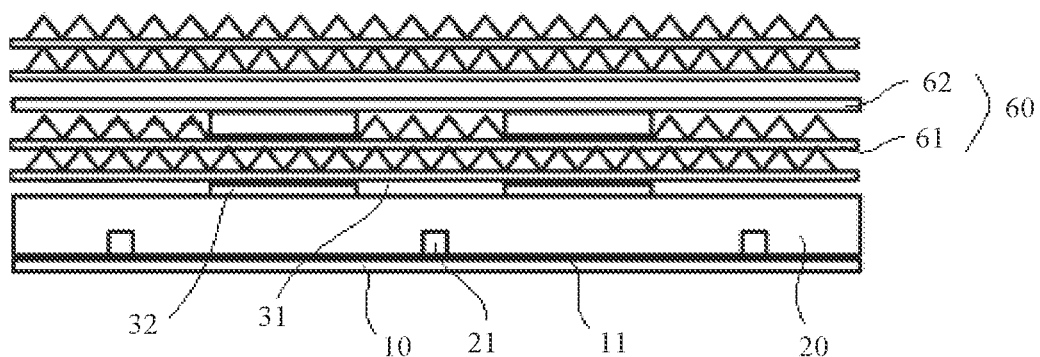
FIG. 7 is a sectional view of another backlight module according to an embodiment of this application.

When the light guide layer 60 is disposed, referring to FIG. 7, the light guide layer 60 includes a prism film 61 bonded to a plurality of gluing layers and a diffusion film 62 disposed on the prism film 61. There may be one prism film 61, or there may be two or more prism films 61. When there are two prism films 61, the two prism films 61 are stacked together in different directions. Prisms on the two prism films 61 may be extended in a perpendicular manner, to improve a brightness enhancement effect. Referring to FIG. 7, one layer of diffusion film 62 is disposed on the prism film 61, and the diffusion film 62 is a conventional film that can perform light diffusion in the prior art. Still referring to FIG. 7, a plurality of gluing layers are also disposed between the prism film 61 and the diffusion film 62, to improve a light mixing effect. Two layers of prism films 61 that extend in perpendicular directions may be further disposed on the diffusion film 62, to improve brightness of a light ray emitted by the backlight module.

The light reflecting layer 31 is disposed above the light source layer 20 and is configured to reflect the some light rays emitted by the corresponding point light source 21. The light reflecting layer 31 reflects the some light rays emitted by the point light source 21, and the light rays are reflected again by the light reflecting surface 11 on the backplane 10 and then emitted from the light transmission layer 32. In this way, the light rays are more uniformly emitted from the backlight module, and a light mixture distance of a backlight structure is reduced.

In addition, this application further provides a display. The display includes any one of the foregoing backlight modules, a polarizer stacked on a side that is of the backlight module and that is away from a backplane, and a display layer stacked on the polarizer, to improve a light mixing effect of the display and reduce a thickness of the display. The display further includes a cover plate stacked on a side that is on the display and that is away from the polarizer, to protect the display layer.

In addition, this application further provides a mobile terminal. The mobile terminal includes a frame and any one of the foregoing displays disposed on the frame, to improve a light mixing effect of the display of the mobile terminal and reduce a thickness of the display.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A backlight module, comprising:
   a backplane having a light reflecting surface;
   a light source layer disposed on the light reflecting surface, wherein the light source layer has at least one point light source; and
   a light mixing component disposed on the light source layer in a one-to-one correspondence with the at least one point light source, wherein each light mixing component comprises:
      a light reflecting layer configured to reflect some light rays emitted by a corresponding point light source; and
      a light transmission layer configured to transmit a light ray reflected by the light reflecting layer and then reflected again by the light reflecting surface,
   wherein each light mixing component further comprises at least one column that is disposed on the light reflecting layer or the light transmission layer and that can reflect light.

2. The backlight module according to claim 1, wherein a light diffusion structure is disposed on at least one of a light input surface and a light output surface of the light transmission layer.

3. The backlight module according to claim 2, wherein the light diffusion structure is a concave-convex structure disposed on the light input surface or the light output surface.

4. The backlight module according to claim 1, wherein scattering particles are disposed in the light transmission layer.

5. The backlight module according to claim 1, wherein the light reflecting layer is disposed on a side that is of the light source layer and that is away from the backplane, and wherein
   the light transmission layer is a part of the light source layer that is not covered by the light reflecting layer.

6. The backlight module according to claim 1, wherein the light reflecting layer is a light reflecting coating covering a surface that is on the light source layer and that is away from the backplane.

7. The backlight module according to claim 1, wherein a vertical distance between the light reflecting layer and the light reflecting surface gradually increases in a direction away from the point light source.

8. The backlight module according to claim 1, wherein a light output surface of the light transmission layer is a convex or concave surface.

9. The backlight module according to claim 1, wherein an area of a cross section of each of the at least one column gradually decreases in a direction away from the light reflecting surface.

10. The backlight module according to claim 1, further comprising a substrate that is disposed on the light source layer and that can transmit light, wherein
    the light reflecting layer is disposed on a surface that is on the substrate and that is away from the light source layer, and wherein
    the light transmission layer is a part of the substrate that is not covered by the light reflecting layer.

11. The backlight module according to claim 1, wherein a plurality of through holes that can transmit light are disposed at the light reflecting layer.

12. The backlight module according to claim 1, further comprising a light guide layer disposed on the at least one light mixing component, wherein
    the light transmission layer is a plurality of gluing layers disposed between the light guide layer and the light source layer, wherein
    the plurality of gluing layers are arranged at intervals to form an air layer between adjacent gluing layers, and wherein
    the light reflecting layer is an air layer.

13. The backlight module according to claim 12, wherein an area of each of the plurality of gluing layers gradually increases from a position close to the corresponding point light source to a position that is away from the corresponding point light source.

14. The backlight module according to claim 12, wherein the light guide layer comprises:
    a prism film bonded to the plurality of gluing layers; and
    a diffusion film disposed on the prism film.

15. A display, comprising:
    a backlight module;
    a polarizer stacked on a side that is of the backlight module and that is away from a backplane; and
    a display layer stacked on the polarizer, wherein the backlight module comprises:
    a backplane having a light reflecting surface;
    a light source layer disposed on the light reflecting surface, wherein the light source layer has at least one point light source; and
    a light mixing component disposed on the light source layer in a one-to-one correspondence with the at least one point light source, wherein each light mixing component comprises:
       a light reflecting layer configured to reflect some light rays emitted by a corresponding point light source; and
       a light transmission layer configured to transmit a light ray reflected by the light reflecting layer and then reflected again by the light reflecting surface,
       wherein each light mixing component further comprises at least one column that is disposed on the light reflecting layer or the light transmission layer and that can reflect light.

16. The display according to claim 15, wherein a light diffusion structure is disposed on at least one of a light input surface and a light output surface of the light transmission layer.

17. The display according to claim 16, wherein the light diffusion structure is a concave-convex structure disposed on the light input surface or the light output surface.

18. The display according to claim 16, wherein scattering particles are disposed in the light transmission layer.

19. A mobile terminal, comprising:
    a frame; and
    a display that is disposed on the frame, wherein the display comprises:
    a backlight module;
    a polarizer stacked on a side that is of the backlight module and that is away from a backplane; and a display layer stacked on the polarizer, wherein the backlight module comprises:

a backplane having a light reflecting surface;

a light source layer disposed on the light reflecting surface, wherein the light source layer has at least one point light source; and a light mixing component disposed on the light source layer in a one-to-one correspondence with the at least one point light source, wherein each light mixing component comprises:

a light reflecting layer configured to reflect some light rays emitted by a corresponding point light source; and a light transmission layer configured to transmit a light ray reflected by the light reflecting layer and then reflected again by the light reflecting surface, wherein each light mixing component further comprises at least one column that is disposed on the light reflecting layer or the light transmission layer and that can reflect light.

\* \* \* \* \*